(12) United States Patent
Crohas

(10) Patent No.: US 11,291,056 B2
(45) Date of Patent: Mar. 29, 2022

(54) METHOD AND DEVICE FOR WIRELESS COMMUNICATION BETWEEN CONNECTED OBJECTS AND GATEWAYS

(71) Applicant: Henri Crohas, Auderghem (BE)

(72) Inventor: Henri Crohas, Auderghem (BE)

(*) Notice: Subject to any disclaimer, the term of this patent is extended or adjusted under 35 U.S.C. 154(b) by 115 days.

(21) Appl. No.: 15/760,377

(22) PCT Filed: Oct. 4, 2016

(86) PCT No.: PCT/EP2016/073596
§ 371 (c)(1),
(2) Date: Mar. 15, 2018

(87) PCT Pub. No.: WO2017/060207
PCT Pub. Date: Apr. 13, 2017

(65) Prior Publication Data
US 2019/0059116 A1    Feb. 21, 2019

(30) Foreign Application Priority Data

Oct. 5, 2015  (BE) .................................. 2015/5622

(51) Int. Cl.
*H04W 74/08*  (2009.01)
*H04B 17/318*  (2015.01)
*H04W 40/24*  (2009.01)
*H04W 48/20*  (2009.01)
*H04W 84/10*  (2009.01)
*H04W 88/16*  (2009.01)

(52) U.S. Cl.
CPC ...... *H04W 74/0866* (2013.01); *H04B 17/318* (2015.01); *H04W 40/244* (2013.01); *H04W 48/20* (2013.01); *H04W 84/10* (2013.01); *H04W 88/16* (2013.01)

(58) Field of Classification Search
CPC .......... H04W 74/0866; H04W 40/244; H04W 48/20; H04W 84/10; H04W 88/16; H04W 40/12; H04B 17/318
See application file for complete search history.

(56) References Cited

U.S. PATENT DOCUMENTS

2003/0145092 A1   7/2003 Funato et al.
2009/0016306 A1*  1/2009 Wang ................. H04W 74/006
                                            370/338

(Continued)

FOREIGN PATENT DOCUMENTS

WO       2009072087       6/2009

OTHER PUBLICATIONS

International Search Report for PCT/EP2016/073596, English Translation attached to original, Both completed by the European Patent Office dated Feb. 21, 2017, All together 9 Pages.

(Continued)

*Primary Examiner* — Kibrom T Hailu
(74) *Attorney, Agent, or Firm* — Brooks Kushman P.C.

(57) ABSTRACT

Methods of communication in a wireless communication network having a plurality of connected objects, a gateway and a central server. These elements communicate with one another via messages sent and received on frequency channels. A channel is reserved for the periodic transmission of tag messages by the gateways, thereby allowing the organization and optimization of the network usage and communication time.

27 Claims, 8 Drawing Sheets

(56) References Cited

U.S. PATENT DOCUMENTS

| | | | |
|---|---|---|---|
| 2010/0232369 A1 | 9/2010 | Jing et al. | |
| 2012/0155349 A1* | 6/2012 | Bajic | H04W 4/80 370/311 |
| 2012/0224484 A1* | 9/2012 | Babiarz | H04L 41/5019 370/235 |
| 2013/0121263 A1 | 5/2013 | Nguyen et al. | |
| 2014/0003355 A1* | 1/2014 | Iyer | H04W 28/0268 370/329 |
| 2014/0111313 A1 | 4/2014 | Wild et al. | |
| 2014/0119350 A1* | 5/2014 | Patel | H04W 16/14 370/336 |
| 2014/0177517 A1* | 6/2014 | Koskela | H04B 7/15507 370/315 |
| 2014/0177604 A1 | 6/2014 | Lee et al. | |
| 2014/0198723 A1* | 7/2014 | Gong | H04W 8/26 370/328 |
| 2014/0301375 A1* | 10/2014 | Nusairat | H04W 56/0005 370/336 |
| 2015/0016435 A1* | 1/2015 | Hedayat | H04W 74/02 370/338 |
| 2015/0036649 A1* | 2/2015 | Chen | H04B 7/2656 370/330 |
| 2015/0098398 A1* | 4/2015 | Hogan | H04L 5/0044 370/329 |
| 2015/0238082 A1* | 8/2015 | Soro | A61B 5/14542 600/300 |
| 2015/0373636 A1* | 12/2015 | Karaca | H04W 48/20 370/332 |
| 2016/0037386 A1* | 2/2016 | Pitchaiah | H04W 4/08 709/226 |
| 2016/0309393 A1* | 10/2016 | Amini | H04W 48/12 |
| 2017/0111855 A1* | 4/2017 | Cao | H04W 48/20 |

OTHER PUBLICATIONS

Sornin et al. LoRa MAC Specification Version SI0.80, XP014159442, 24 Pages, Dated Jan. 16, 2014, "LoRa MAC Specification".

\* cited by examiner

METHOD AND DEVICE FOR WIRELESS COMMUNICATION BETWEEN CONNECTED OBJECTS AND GATEWAYS

CROSS-REFERENCE TO RELATED APPLICATION

This application is the U.S. national phase of PCT Application No. PCT/EP16/073596 filed on Oct. 4, 2016, which claims priority to BE Patent Application No. 2015/5622 filed on Oct. 5, 2015, the disclosures of which are incorporated in their entirety by reference herein.

TECHNICAL FIELD

The invention relates to the communication protocols in a radiofrequency network and, more particularly, to methods allowing this type of communication within a wireless network with long range and low power. In its application in a layered model, the invention relates to the protocol of the link layer (the layer comprising the Media Access Control MAC). The invention relates also to devices implementing these methods.

STATE OF THE ART

Methods for exchanging data in a wireless network comprising connected objects, gateways and a central server are known. For example, the patent application US 2014/0111313 discloses a communication method in which a connected object must perform numerous steps before connecting to a gateway. These steps consist in:
- listening for a periodic signal containing a beacon signal transmitted by at least one gateway;
- synchronization of the internal clock of the connected object with the beacon signal;
- identification of the gateway by the connected object by virtue of the beacon signal contained in the periodic signal;
- selection of the gateway having the strongest beacon signal;
- sending of a message on a join request time slot by the connected object;
- identification of the connected object by the gateway and assignment of a time slot in the periodic signal for the communications;
- reception of the time slot by the connected object during a join acknowledgement slot;
- communication between the connected object and the gateway on the assigned time slot. This type of protocol presents a number of limitations. Firstly, the management of the usage time is far from being optimal because the subdivision of the periodic signal into time windows and time subwindows extends the delays between the communications. Secondly, if the number of gateways is increased, the duration of the periodic signal increases (or the number of subwindows decreases) which commensurately extends the delays between the communications (or reduces the number of subwindows that can be assigned by a gateway). Thirdly, the number of timeslots that can be assigned by a gateway to connected objects is limited for the periodic signal not to become too long. The risks of saturation of the network therefore become significant. Fourthly, the frequency usage of the network is limited and not optimized. Fifthly, the connected objects have to be resynchronized regularly to be able to communicate in their time slot, which consumes energy. In conclusion, this protocol lacks flexibility, is ill suited to objects communicating occasionally and does not optimize the use of the time that can be used for communications.

Another method for exchanging data in a wireless network is described in the LoRa communication protocols (https://www.lora-alliance.org/) which describes a network comprising a set of macro-cells each comprising connected objects and a macro-gateway (of rooftop kind). Each macro-gateway is capable of receiving several messages simultaneously over channels of different frequencies and at different transfer rates (or throughputs, that is to say the quantity of digital data transmitted per unit of time expressed in bit/s or octet/s) (approximately 8 channels and 8 transfer rates). A connectable connected object having a message to be sent semi-randomly selects a channel and a compression factor (dependent on its distance from the macro-gateway) and sends its message. This protocol also presents a number of defects. Firstly, the usage time is not organized: each connected object sends its data when it wants with the sole condition of not exceeding any legal usage limits. Consequently, given the large number of connected objects potentially linked to a macro-gateway, the probability of message collision can become significant. Secondly, the macro-gateway sends information only exceptionally. The reasons are that, when the macro-gateway transmits a signal, it dazzles the uplink signals and is then incapable of receiving a message. Another reasons is that the transmission time in a public frequency band and/or the rate of use of this band by a transmitter are in most cases severely restricted by the regulatory radio authority and since these macro-gateways aim to serve a large number of objects, the transmission time that they can devote to individual objects is extremely limited. Consequently, if the macro-gateway transmits, it will occupy a part of the time which will reduce the time available for listening for uplink messages and will contribute to exhausting the occupancy time capital of the downlink pathway allotted by the regulatory authority. This will therefore increase the delays waiting for the connected objects to communicate and the risks of message collisions. Furthermore, if the macro-gateway transmits messages regularly, it risks rapidly reaching the legal time usage limits. For the same reasons, the macro-gateway only exceptionally sends an acknowledgement to the connected objects which can also pose a problem.

In other words, the usage time of the network is not optimal and the network saturates. This situation is all the more probable when the macro-gateways serve macro-cells comprising potentially a large number of connected objects.

SUMMARY OF THE INVENTION

The invention is defined by the independent claims. The dependent claims define preferred embodiments of the invention.

According to a first aspect, the invention relates to communication methods in a wireless communication network using a plurality of channels each having a central frequency and a bandwidth, said network comprising a plurality of connected objects and at least one gateway, said connected objects and the at least one gateway being able to transmit and receive messages in each of the channels, at least one of these channels, called beacon channel, being a one-way communication channel reserved for the periodic or quasi-periodic transmission of beacon messages by the gateways (120). The beacon message comprises at least the following elements: a preamble, either an indication that the gateway wants to deliver a message or that it is able to receive at least one message and an indication of at least one channel for exchanging at least one message.

Alternatively, the communication network is a wireless communication network using a plurality of channels each having a central frequency and a bandwidth, said network comprising a plurality of connected objects and at least one gateway, said connected objects and the at least one gateway being able to transmit and receive messages in each of the channels, at least one of these channels, called beacon channel, being reserved for the periodic or quasi-periodic transmission of beacon messages by the gateways. The beacon channel comprises at least one of following two elements: a preamble, or, either an indication that the gateway wants to deliver a message or that it is able to receive at least one message and an indication of at least one channel for exchanging at least one message.

One of the aims of the invention is to resolve the problems of saturation of the networks as described above, to optimize the use of the time and of the frequencies. The method according to the invention allows potentially an unlimited number of connected objects to exchange communications with a gateway (in practice, the number of objects is limited by the capacity of the network, that is to say the physical time taken by the communications). Furthermore, the invention makes it possible to reduce the number of collisions of messages and allows a simple and effective addition of gateways in the network. The proposed solution consists in the use of beacon messages transmitted by gateways over one beacon channel that is one-way and reserved for the periodic transmission of said beacon messages. These beacon messages make it possible to alert the connected objects to the availability of a gateway for transmitting or receiving messages and to inform the connected objects of the channel over which the exchange will be conducted. They also allow the connected objects to select a gateway with which they will have a good communication. Furthermore, the communication method is simple because the connected objects can send a message at any moment from the instant when they receive a beacon message. The connected objects therefore no longer have to be associated with a particular gateway and/or maintain a perfectly synchronized internal clock. The connected objects can be synchronized automatically on the beacon signal when they want to transmit or receive data. The connected objects are free to choose a gateway and can easily change gateway. The communication times and the frequencies used are therefore well organized and made cost effective. Finally, by virtue of the beacon message which indicates the presence of a gateway, other gateways can be organized without external intervention and the addition of a gateway makes it possible (without external intervention) to increase the capacities of the network.

The first communication method in a wireless communication network relates to the communications between a plurality of connected objects and at least one gateway. This method is a method by which:

(A). a connected object transfers a message to a gateway. For that, the connected object listens to the beacon channel or channels to detect at least a part of at least one beacon message. Next, the connected object selects a gateway transmitting a beacon message perceptible by the connected object. The connected object receives the beacon message transmitted by the selected gateway. It then verifies, by consulting the indication, contained in the beacon message, that the gateway either wants to deliver a message or that it is able to receive at least one message. Finally, the connected object transmits a message to the selected gateway over at least one channel indicated in the beacon message.

(B). a connected object receives a message from a gateway. For that, the connected object listens to the beacon channel or channels to receive at least one beacon message. Next, the connected object verifies that the gateway wants to deliver a message to it. Finally, the connected object receives a message over at least one channel indicated in the beacon message.

Alternatively, the method is a method by which:

(A). a connectable connected object transfers a message to a gateway. For that, the connected object listens to the beacon channel or channels to detect at least a part of at least one beacon message, said part of the beacon message making it possible to determine an RSSI of the signal transporting said beacon message. Next, the connected object selects a gateway as a function of the RSSI, then, it receives the beacon message transmitted by the selected gateway and it verifies, by consulting the indication, contained in the beacon message, that the gateway either wants to deliver a message or that it is able to receive at least one message. Finally, the connected object transmits a message to the selected gateway over at least one channel indicated in the beacon message.

(B). a connectable connected object receives a message from a gateway. For that, the connected object listens to the beacon channel or channels to receive at least one beacon message. Next, the connected object verifies that the gateway wants to deliver a message to it. Finally, the connected object receives a message over at least one channel indicated in the beacon message.

Preferably, a connected object listens to the beacon channel or channels to detect at least a part of at least one preamble, said part of the preamble making it possible to determine an RSSI of the signal transporting the beacon message. The connected object then selects a gateway as a function of the RSSI. The advantage of this preamble is, on the one hand, to avoid losing a useful part of the message and, on the other hand, to allow an easy detection of the signal, the preamble being, for example, composed of powerful and easily detectable chirp signals. In the alternative method, the beacon message also comprises a preamble.

Preferably, the beacon message further comprises at least one identifier of at least one connected object and a connected object verifies that the gateway wants to deliver a message to it by verifying that the at least one identifier contained in the beacon message is its own. This constitutes a simple and effective method for the connected object to ensure that the message is intended for it.

Preferably, the connected object which wants to send a message chooses its transfer rate as a function of the RSSI for this rate to be higher when the RSSI is high and lower when the RSSI is lower. This step, which can be repeated on each sending, thus minimizing the random factors inherent in the fluctuations of the radio channel over time, allows for better use of the useful time by minimizing the transfer times when the connected objects are close to the gateway. Also, that makes it possible to guarantee a good transmission of the signals at long range and low power when the connected object is further away from the gateway. The transfer rate or throughput is defined as the measurement of the quantity of digital data transmitted per unit of time.

Preferably, the connected object waits for a time period which is a function of the chosen transfer rate before sending its message. In effect, the gateway which receives the messages may have to scan the different transfer rates to detect the message, so it is essential for the latter to be sent at the right moment.

Preferably, the connected object or the gateway transmits or receives an acknowledgement of the radiofrequency transmission over the same channel as that used either for the transmission or for the reception. This acknowledgement is transmitted by the connected object or the gateway which has received a message after the reception. The aim of this step is to notify the transmitter that its message has indeed been received. The aim of this acknowledgement is that if a transmitter does not receive any acknowledgement, it knows that its message has not been delivered and it can retry sending it at a subsequent moment.

Preferably, the acknowledgement is an acknowledgement of the RF transmission and is sent directly after the reception of a message.

Preferably, the acknowledgement is transmitted or received with a transfer rate that is equal to or less than that of the message received or transmitted. This makes it possible to not have to scan all the transfer rates to find the acknowledgement.

Preferably, the gateway chosen by a connected object when it wants to send a message is one of the gateways having the highest RSSI. The aim is to ensure a rapid transfer and to optimize the network usage time.

Preferably, the gateway chosen by a connected object when it wants to send a message is a gateway having a high quality of service (QoS). Preferably, the gateway chosen by a connected object is that which makes it possible to convey a given type of traffic in good conditions, that which is available, which has a good throughput, good transmission delays, a low packet loss rate. Alternatively, the selected gateway is that having a high transmission signal-to-noise ratio.

Preferably, the network further comprises a central server, said central server being able to assign a gateway to a connected object. For various reasons: quality of service, economy, it may be advantageous to link a connected object to a gateway.

According to a second aspect, the invention consists of a device comprising a radiofrequency modem, characterized in that it implements a procedure described above.

The second communication method in a wireless communication network relates to the communications between a gateway and a connected object. In this method, the beacon message can be transmitted in time windows specific to each gateway. This method is a method by which:
  (A). a gateway transmits, in its time window, a signal transporting a beacon message.
  (B). a gateway receives at least one message from a connected object. In this case, the gateway begins by listening to the channel or channels assigned in the beacon message in order to detect a message. Next, the gateway receives the message that it has detected.
  (C). a gateway sends at least one message to at least one connected object over at least one channel indicated in the beacon message.

Preferably, the beacon message further comprises at least one identifier of at least one connected object. A gateway wanting to send a message to at least one connected object sends the identifier of the connected object or objects in its beacon message to inform it or them that said gateway has a message to be delivered to it or them.

Preferably, the gateway which wants to receive a message scans different transfer rates simultaneously or sequentially and listens on the channel or channels assigned in the beacon message to detect a message. This step allows better use of the useful time by minimizing the transfer times when the connected objects are close to the gateway and they use a high transfer rate. Also, that makes it possible to guarantee a good transmission of the signals at long range and at low power when the connected object is further away from the gateway and uses a low transfer rate.

Preferably, the message sent by the connected object comprises a preamble and the gateway scans different transfer rates and listens on the channel or channels assigned in the beacon message to detect at least a part of a preamble. The advantage of this preamble is, on the one hand, to avoid losing a useful part of the message and, on the other hand, to allow an easy detection of the signal, the preamble being composed of powerful and easily detected chirp signals.

Preferably, the gateways can transmit their beacon message over two parallel beacon channels. The transmitted signals transporting the beacon messages over the two channels being, preferably, orthogonal.

Preferably, the connected object or the gateway transmits or receives an acknowledgement of the radiofrequency transmission over the same channel as that used either for the transmission or for the reception. This acknowledgement is transmitted by the connected object or the gateway which has received a message after the reception. The aim of this step is to notify the transmitter that its message has indeed been received. The aim of this acknowledgement is that, if a transmitter does not receive any acknowledgement, it knows that its message has not been delivered and it can retry sending it at a subsequent moment.

Preferably, the acknowledgement is an acknowledgement of the RF transmission and is sent directly after the reception of a message.

Preferably, the acknowledgement is transmitted or received with a transfer rate equal to or lower than that of the message received or transmitted. This makes it possible to not have to scan all the transfer rates to find the acknowledgement.

According to a third aspect, the invention consists of a device comprising a radiofrequency modem, characterized in that it implements a procedure described in the paragraphs concerning the second method (that is to say those included between the paragraph beginning with "the second method" and the paragraph preceding the latter).

The third communication method in a wireless communication network relates to the communications between at least two gateways. In this method, the beacon message can be transmitted in time windows specific to each gateway. This method is a method by which a time window is associated with a gateway. For that, the gateway listens to the beacon channel or channels during at least one entire period. Next, if the gateway has detected at least a part of a preamble and at least one time window is available, the gateway chooses one of these windows and said gateway begins to transmits its beacon message. If the gateway has detected at least a part of a preamble and no time window is available, the gateway is set to standby. If the gateway detects no preamble, it chooses a time window and it begins to transmit its beacon message.

Preferably, a gateway which was set on standby because no time window was available is reactivated after at least one period of transmission of beacon messages and recommences searching for an available time window.

Preferably, the network further comprises a central server, said server determining the order of the time windows of each of the gateways.

Preferably, the server assigns the time windows to the gateways.

Preferably, the server assigns a companion channel to a gateway, this companion channel allowing only the gateway to receive messages in a time window used by another gateway.

The fourth communication method in a wireless communication network relates to the resynchronization of the gateways. This method is a method by which a gateway listens to at least a part of the beacon messages from the other gateways during at least one entire period of transmission of beacon messages. Next, said gateway computes a reference time as a function of the beacon message or messages received and finally, the gateway adjusts its time window.

Preferably, the network further comprises a central server, said server controlling and initiating the synchronization of each gateway after a predefined number of periods of transmission of beacon messages.

BRIEF DESCRIPTION OF THE DRAWINGS

These aspects and other aspects of the invention will be clarified in the detailed description of particular embodiments of the invention, reference being made to the drawings of the figures, in which.

The drawings of the figures are not to scale. Generally, similar elements are denoted by similar references in the figures. The presence of reference numbers in the drawings cannot be considered as limiting, including when these numbers are indicated in the claims.

DETAILED DESCRIPTION OF SOME EMBODIMENTS OF THE INVENTION

Figure 1:
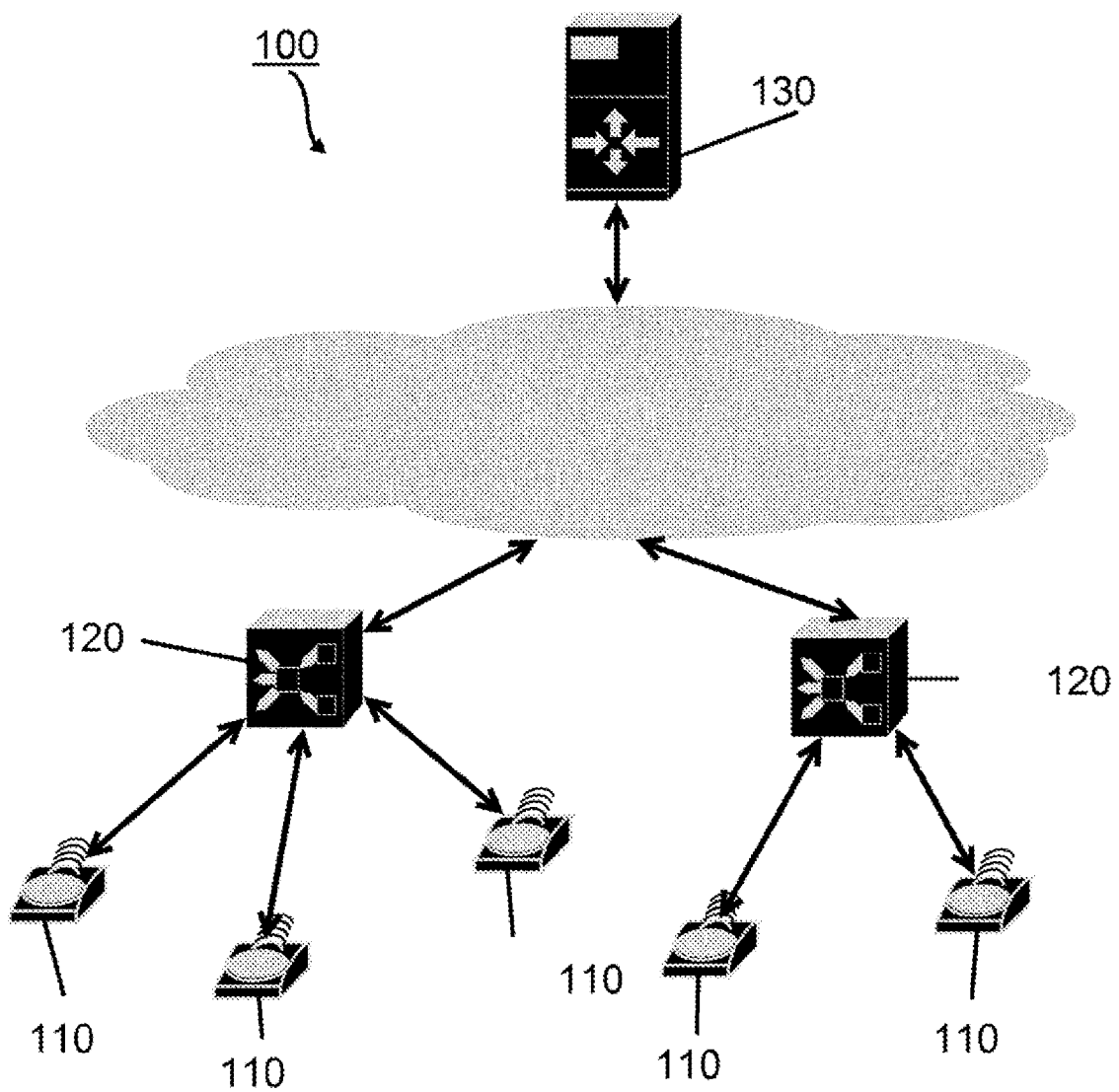
FIG. 1 shows an example of wireless communication network.

FIG. 1 shows an example of wireless communication network 100 comprising a plurality of wireless connected objects 110, at least one gateway 120. Preferably, the network comprises a plurality of gateways. Preferably, the gateway or gateways are connected to a central server 130. This connection can be a local area network connection, a wired (Ethernet) or wireless (Wi-Fi) internet connection. Preferably, the server is a cloud-type server. Preferably, the connected objects—gateways network is a low-power wide area wireless network, LP-WAN.

The standard term "connected object" should be understood to be an object which is actually connected to a network or which is connectable to a network.

In the present invention, the connected objects are not linked to a particular gateway, in other words, they are not registered in a fixed manner with a gateway. They can change gateway as a function, for example, of the quality of the beacon signal received, of the presence of a new closer beacon, of an economic benefit. The objects are, preferably, objects compatible with an LP-WAN network. It is known that this type of connected object does not communicate much data and communicates infrequently (typically a few tens of octets per day). It therefore does not consume much electrical energy and only occasionally occupies the communication bandwidth. By contrast, the number of connected objects of LP-WAN type is potentially high within the range of a gateway (typically several tens, even several hundreds).

Figure 2A:
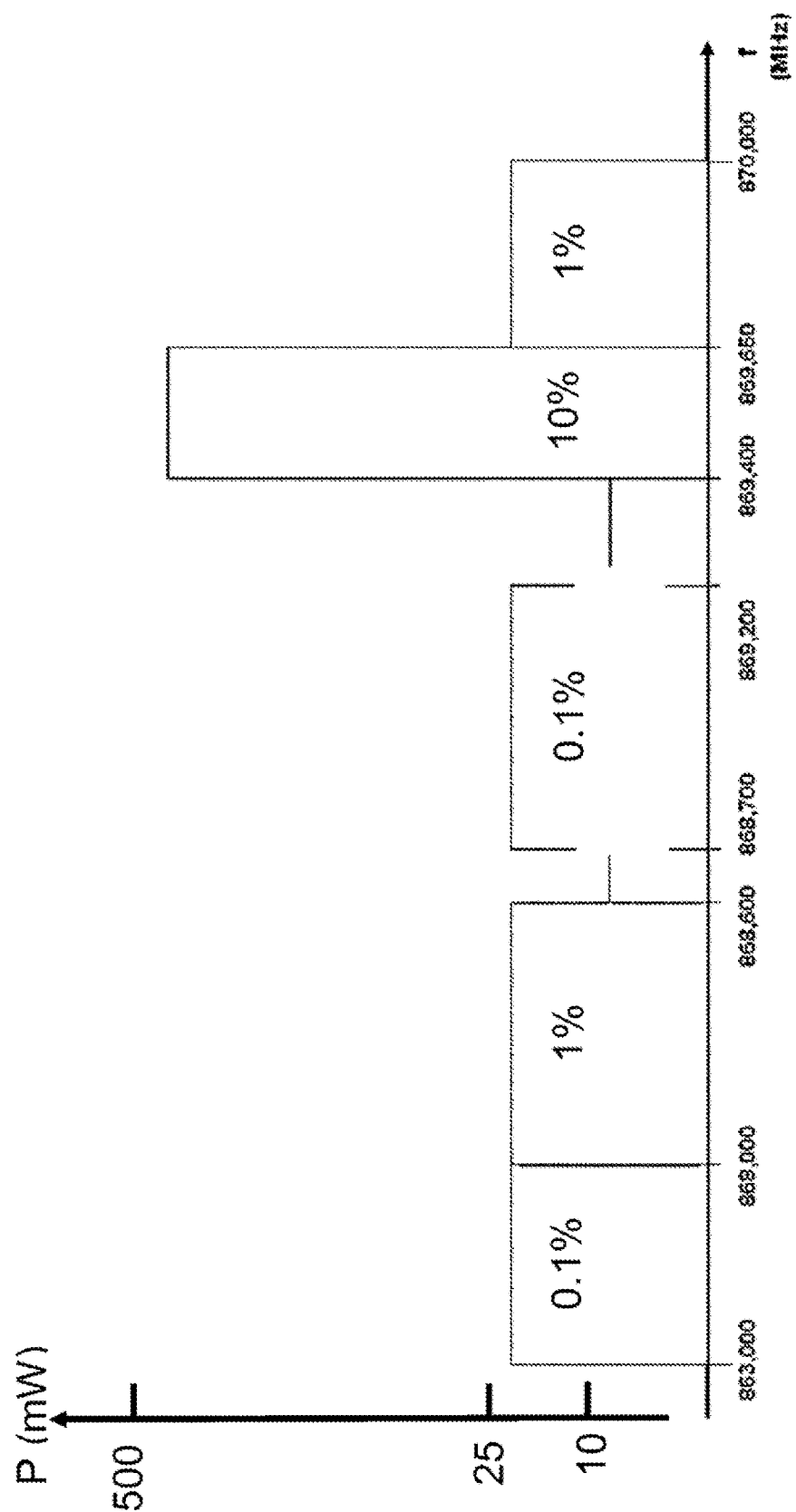
FIG. 2a shows a simplified example of 868 MHz ISM frequency band.

Preferably, the network uses a plurality of frequency channels characterized by a central frequency and a bandwidth. The connected objects 110 and the gateways 120 can transmit and receive messages in each of the channels. FIG. 2a shows a simplified example of 868 MHz ISM frequency band, the percentages indicate the time occupancy rate of the band legally authorized (duty cycle) by a connected object. Preferably, the communications between the connected objects and the gateways are conducted in this frequency band. Alternatively, any other frequency band can be used.

Preferably, at least one of the channels, called beacon channel, is a one-way channel reserved for the periodic or quasi-periodic transmission of beacon messages by the gateways 120. For example, in the 868 MHz ISM band (the industrial, scientific and medical ISM bands are frequency bands which can be used for industrial, scientific, medical, domestic or similar applications, with no authorization request), the beacon channel or channels can be situated in the 869.40 to 869.65 MHz sub-band whose admissible occupancy rate is 10%. Preferably, it is possible to have two beacon channels of 62.5 kHz bandwidth and respectively centered on the frequencies 869.46825 MHz and 869.58175 MHz. Alternatively, it is possible to have one beacon channel of 125 kHz bandwidth, or even four beacon channels of 41.7 kHz bandwidth. These channels can have different spectrum spreading factors (SF). Preferably, the number of beacon channels will be adjusted to the frequency sub-band used as a function of the frequency width thereof and of any constraints on authorized occupancy rate of the frequency band or sub-band.

In telecommunications, a (radio-)beacon is a transmitter which transmits a signal (beacon) in a frequency band. This beacon signal makes it possible to signal the presence of the transmitter and to guide the receivers of this signal in relation to the transmitter. This transmitter can be associated with an obstacle (a lighthouse), a hazard. A beacon message is therefore a one-way message transmitted by a gateway (transmitter) to connected objects and/or gateways (receivers).

It is also known by the person skilled in the art that a reserved (frequency) channel means that the frequency band is dedicated to a specific use. For example, the frequency band centered at 3023 kHz is the international frequency band reserved for aeronautical emergencies, coordinated search and rescue operations, (air/sea/land) interconnections. The beacon channel of the invention is therefore a frequency channel dedicated to the periodic or quasi-periodic transmission of beacon messages by the gateways 120, that is to say that this frequency channel is used exclusively and solely for the sending of the beacon messages by the gateways.

Figure 2B:
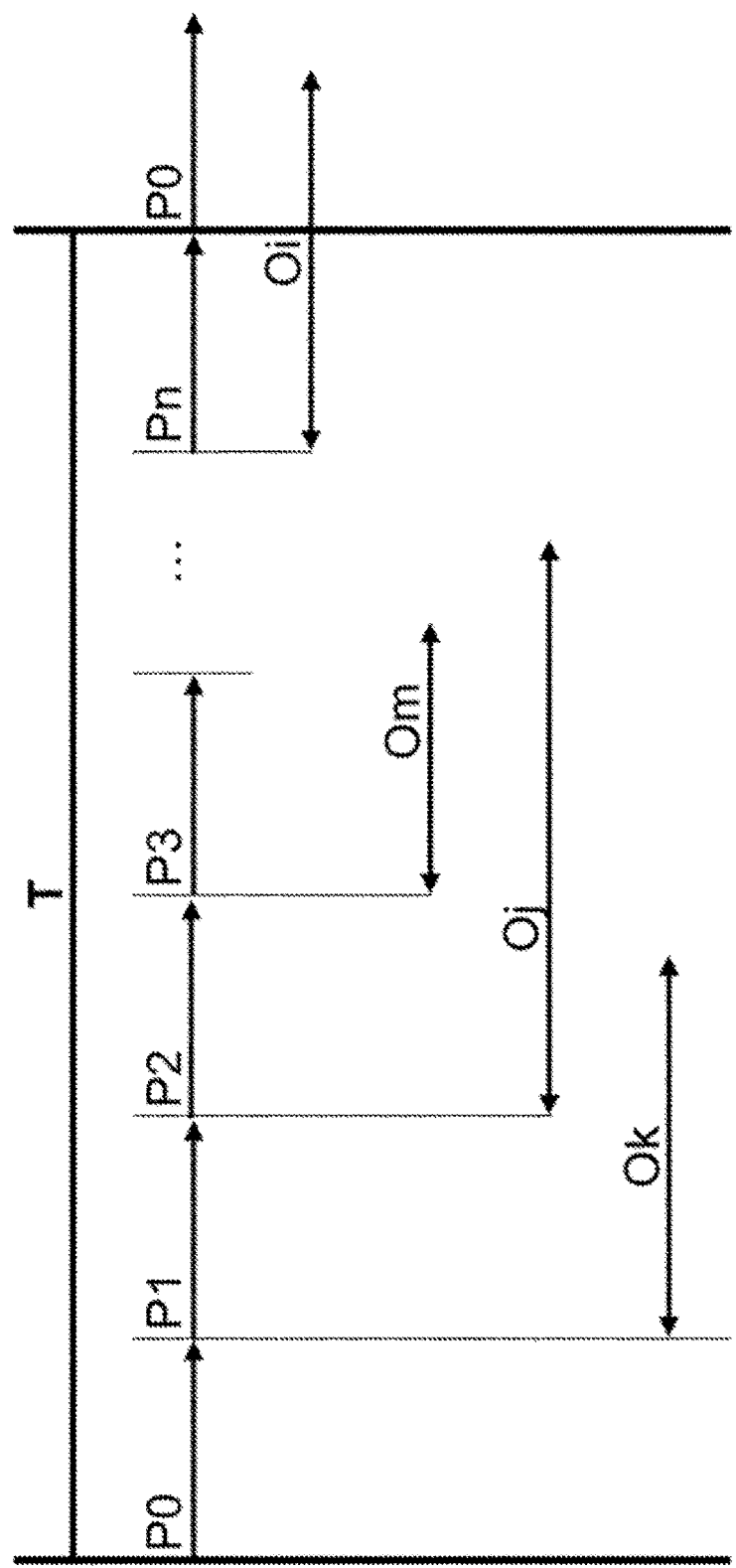
FIG. 2b shows an example of time subdivision.

FIG. 2b shows an example of subdivision of the time according to the periodic transmission of period T, of beacon message. In this figure, the arrows to the right indicate the transmission of a beacon message which is therefore one-way, the double arrows indicate either a downlink message (to the right) or an uplink message (to the left), just one of these two operations being able to be performed during a period T, the start of the communication being always at the left origin of the arrow, the duration of the communication being able to be variable. For example, the n gateways 120 (P0, P1, . . . ) in turn transmit their beacon message. Preferably, each gateway transmits its beacon message in a time window which is specific to it. Once its beacon message is transmitted, a gateway either listens to receive an uplink message, or transmits a downlink message for a connected object 110 (Oi, j, k, m). Preferably, the duration of the transmission depends of the size of the message to be transmitted and can be variable. Preferably, the maximum number of gateways depends on the possible constraints of authorized occupancy rate and on the number of beacon channels. For example, in the case of a 10% limit and only one beacon channel, the maximum number of gateways making it possible to optimize the time is ten gateways if an average beacon message time of Tb=50 ms is considered for a cycle period T of 500 ms and a processing time by the chips of Tp=4 ms. In effect, the following then applies: Tb/(Tb+Tp)/10=50/(50+4)/10=9.25%. Alternatively, two gateways can transmit their beacon message simultaneously over two distinct channels, which makes it possible to double the maximum number of gateways. Furthermore, these gateways transmitting simultaneously can transmit over orthogonal channels that overlap one another but without interfering because of the orthogonality of their signals at the physical layer level (for example by using orthogonal chirps).

Figure 2C:
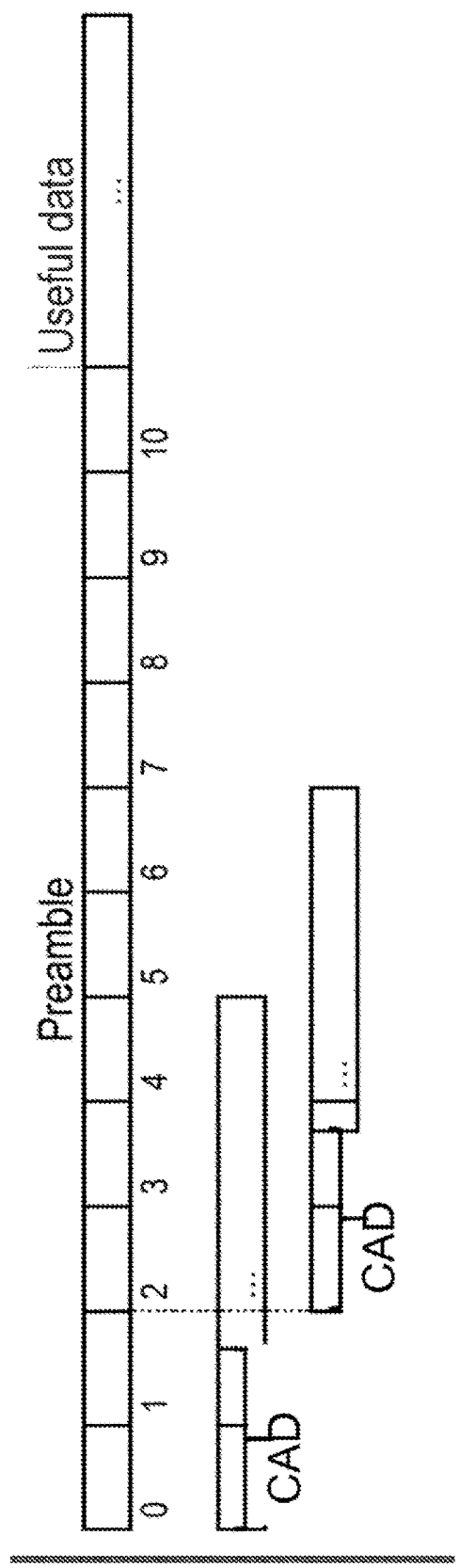
FIG. 2c shows an example of scan of two frequencies with a 10-symbol preamble.

The possibility of two gateways 120 simultaneously transmitting their beacon message is all the more interesting as some radiofrequency (RF) transceiver chips, such as the SX127x chips from Semtech based on the LoRa transmission protocol at the physical layer level, for example, can detect activity on a frequency channel (Channel Activity Detection CAD) in a very short time by analyzing very few symbols of the signal. This CAD allows a connected object 110 to detect a signal with only 1.8 symbols. Preferably, the messages exchanged in the network 100 comprise a preamble of ten or so symbols. FIG. 2c shows an example of scan of two frequency channels with a 10-symbol preamble, these symbols preceding the useful data of the message. For example, in the case of a network comprising two beacon channels, a connected object can detect an activity on a first channel by analyzing 1.8 symbols of a preamble transmitted over this first channel, then it can change channel and detect an activity on a second channel by analyzing 1.8 symbols (if the signals are transmitted at the same time they are the symbols 2 to 3.8) of a preamble transmitted over this second channel. This CAD feature of the chips such as the SX127x chips also makes it possible to assess the strength in reception of a received signal (Received Signal Strength Indication or RSSI) in a very short time in the same way.

Preferably, the beacon message comprises at least some of the following elements:

a) a preamble: for example, a series of chirp signals each representing a symbol of the signal. Preferably, this series comprises 5 to 20 signals. Even more preferably, 8 to 12.

b) either an indication that the gateway wants to deliver a message or that it is able to receive at least one message: for example, that can be reflected by the presence of an Uplink bit: if Uplink=1 (uplink: the gateway is able to receive at least one message), if Uplink=0 (downlink: the gateway wants to deliver a message).

c) an indication of at least one channel for exchanging at least one message: for example, this indication can be reflected by a series of bits (preferably 4 bits for 16 channels), this series of bits coding a number associated with a particular channel. For example, if the bit codes the number 1, that means that the exchange of message will take place over the channel 1 corresponding to a bandwidth and a central frequency agreed in advance and predefined for example in the manufacture of the connected objects and gateways.

d) an identifier of a connected object: for example, this identifier can be reflected by a series of bits (preferably 1 to 40, or preferably 10 to 30, or preferably 16 bits), if the Uplink bit=0, this series comprises an identifier of a connected object or of a group of connected objects to which the message is intended. If the Uplink bit=1, this part of the beacon message can, for example, make it possible to transmit information flags to the connected objects.

e) a companion channel indication: for example, this indication can be reflected by a series of bits of the same length as the series for indicating a channel for exchanging at least one message. This indication can be used in the case where the maximum number of gateways is reached in the network. This indication can alternatively be used in the case where two gateways are very close to one another. In these exemplary cases, a new gateway can become silent companion of a gateway transmitting a beacon signal. The companion channel indication allows a connected object to send a message not only to the transmitting gateway but to the silent one, which doubles the reception capacity.

f) an indication of the beacon channel used: for example, this indication can be reflected by a bit in the case where there are only two beacon channels.

g) an indication of the time window used: for example, this indication can be reflected by a series of bits (preferably 1 to 20, or preferably 2 to 10, or preferably 4 bits), which, associated with the indication of the beacon channel used, allow the gateways to identify themselves or be identified.

h) control information: for example, a cyclic redundancy check (CRC).

i) a group (cluster) identification: when several networks come together to form a wider network, the central server can group them together into subnetworks or clusters which are identified by a number coded by a series of bits.

Figure 3:
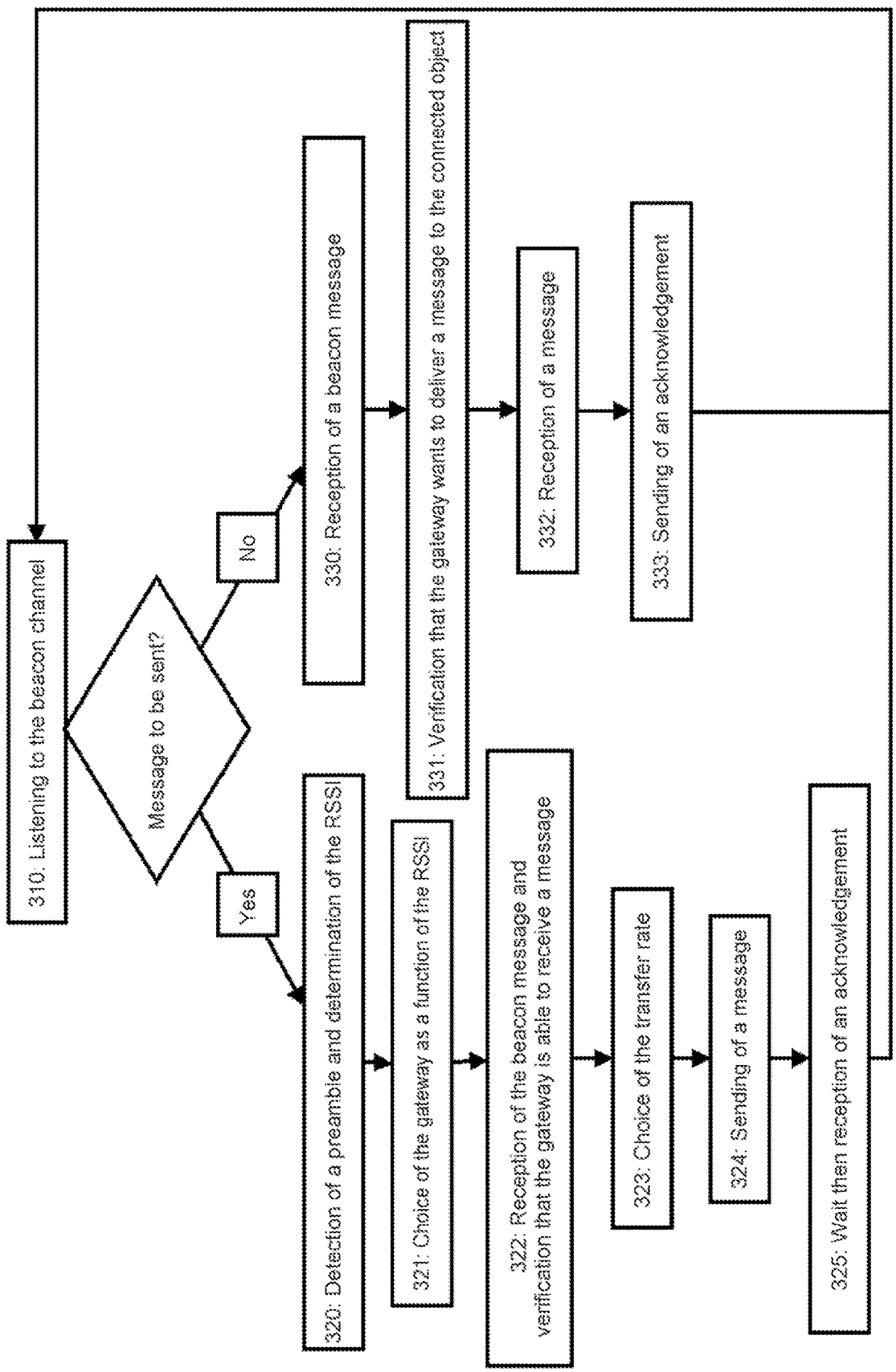
FIG. 3 shows a diagram of the communication method between a connected object and a gateway according to the invention.

FIG. 3 shows a diagram of the communication method between a connected object 110 and a gateway 120 according to the invention. The first step consists in listening to at least one beacon channel 310. The second step depends on the type of communication: either the connected object wants to transmit a message to the gateway, or the connected object wants to verify that the gateway possibly wants to deliver a message to it and, if necessary, receive this message from the gateway. In the first case, the connected object which wants to transmit a message to a gateway performs the steps of detection of at least a part of at least one beacon message. Preferably, the beacon message comprises a preamble and the detected part is a part of the preamble.

Preferably, this part of the beacon message makes it possible to assess the strength in reception of a received signal (RSSI) 320. The RSSI makes it possible to provide an indication on the intensity of the received signal. Alternatively, other methods for assessing the force of the signal can be used.

The next step consists in selecting a gateway 120, preferably, as a function of the RSSI 321. The selected gateway can be that exhibiting the highest RSSI. Alternatively, the selected gateway is that exhibiting a sufficient quality of service (QoS) and therefore that which makes it possible to convey a given type of traffic in good conditions, that which is available, which has a good throughput, good transmission delays or a low packet loss ratio. Alternatively, the selected gateway is that exhibiting a high transmission signal-to-noise ratio.

Alternatively, the central server 130 can link a connected object 110 to a preferential gateway 120. The connected object will always try to connect as a priority to this preferred gateway. In the case where it does not manage to do so, it can connect to a gateway exhibiting a good RSSI.

The aims of this priority link can be varied but an economic aim can be highlighted. In effect, the payment for the use of the network is usually done from the point of view of the connected objects. Each connected object connecting to a gateway pays an "access fee" to the network 100. For example, the connection costs can be 0.5€/connected object/year. For their part, the gateways are inexpensive to produce and can be sold, for example, for 50€ and be installed very easily (power supply via a current outlet or via an Ethernet socket, for example). A gateways installer can then become provider for access to a radiofrequency (RF) network fairly easily. It is then very advantageous to be able to link a connected object to a particular gateway for the service provider to be able to be better paid as a function of the traffic which passes through its own gateways.

Once a gateway 120 has been selected by a connected object 110, the latter receives the entire beacon message and verifies that the gateway is able to receive a message 322. For that, the connected object can, for example, verify the value of the Uplink bit contained in the beacon message. The beacon message also comprises an indication of at least one channel for exchanging messages and to which the gateway listens.

If the gateway is able to receive a message, the connected object transmits a message 324 to this gateway over the channel indicated by the gateway in its beacon message.

Preferably, the connected object 110 chooses a transfer rate 323 for its message as a function of the RSSI such that the transfer rate is higher if the RSSI is high and the transfer rate is lower if the RSSI is low. For example, the SX127x chips use the technique of spectrum spreading at the radiofrequency (RF) physical layer level which is a transmission method in which the transmitted energy is deliberately spread or distributed in the frequency domain. The aim of this technique is to ensure a good communication. In effect, the connected objects furthest away will use a greater spread and the connected objects closest will use a lesser spread. Over a given time, the data transfer rate will therefore be lower for the connected objects furthest away and greater for the connected objects that are close. The spectrum spreading factor (SF) which is defined as the ratio between the spread bandwidth and the unspread bandwidth, is therefore an indirect measurement of the transfer rate. Consequently, the higher the RSSI, the less spread the spectrum and the lower the SF and the higher the transfer rate. A low SF is also synonymous with a more rapid transmission since the transfer rate is higher. For example, the number of transfer rates can lie between 1 and 20. Preferably, it lies between 1 and 10. Even more preferably between 4 and 8. Preferably, the SFs range from 7 to 12.

Preferably, as soon as the sending of its message ends, a connected object 110 switches to listening mode and waits to receive an acknowledgement of the radiofrequency RF transmission 325 transmitted by the gateway 120. The aim of this acknowledgement is, for example, to indicate to the connected object that the RF transmission has proceeded correctly. In another example, this acknowledgement can contain information on the correct transmission of the message by the central server 130.

Preferably, this acknowledgement is received over the same channel as that used for the transmission of the message. Preferably, the acknowledgement is received with a transfer rate equal to or less than that of the transmission of the message. Preferably, this acknowledgement is a short message whose useful part comprises between 8 and 32 bits, preferably, the useful part comprises 16 bits.

If the connected object 110 does not receive any acknowledgement, it can once again try to send its message in the next period T. The reasons for which a connected object may not receive an acknowledgement can be varied: interference, instability of the communication channel, fading, multiple signal reflections, bad communication, interruption of the communication, current outage depriving the gateway 120 of its power supply, etc. Nevertheless, one of the most common reasons is the collision of messages. If two connected objects transmit their message at the same time, these messages may come into collision. There are then two possible scenarios: either one of the messages is well received and the other not, or neither of the messages is correctly received. In both cases, at least one of the two connected objects will not receive its acknowledgement. In this case, the connected object or objects will retry sending their message after a random number of periods T (this number lying for example between 1 and 3). If a new collision occurs, the connected object or objects will retry after a random number of periods T greater than the preceding one (for example between 4 and 8). This capacity to deliver acknowledgements is made possible by the use of several communication channels which avoid reaching the legal limits of use of the public frequency bands. This feature provides a significant advantage over the LoRa protocol and the protocol described in the patent application US 2014/0111313. In the first case, the gateway, although using several channels, is incapable of responding to each connected object without rapidly reaching the legal limits and/or blocking the uplink messages to it. In the second case, the poor use of the frequency channels and the time subdivision means that a connected object must, at best, wait for its downlink time slot of the next period to receive this acknowledgement, a long time in the case of a network comprising a large number of connected objects.

In the case where the connected object 110 wants to verify that the gateway 120 wants to possibly deliver a message to it and, if necessary, receive this message from the gateway, the latter begins by receiving the beacon messages 330 from the different gateways. The connected object verifies that the beacon message indicates that the gateway which has transmitted it has a message to deliver to it 331.

Preferably, the beacon message comprises an identifier specific to the connected object 110. Preferably, this identifier can be common to a group of connected objects. Alternatively, the identifier can comprise a part common to a group of connected objects and a part specific to each connected object. This making it possible to deliver messages to groups of connected objects or to deliver individual messages to each connected object. Alternatively, any means allowing a connected object or a group of connected objects to be identified directly or indirectly can be used (sending of messages at a specific time, specific encryption, specific channel, etc.).

Preferably, the beacon message from the gateway 120 indicates on which channel the message is sent. Preferably, the beacon message from the gateway indicates the transfer rate used to send the message to be delivered. If the message is intended for the connected object 110, the latter receives the message 332 over the channel indicated by the gateway.

Preferably, the connected object 110 which has correctly received a message transmits an acknowledgement to the gateway 120. Preferably, this acknowledgement is received over the same channel as that used for the transmission of the message. Preferably, the acknowledgement is received with a transfer rate equal to or less than that of the transmission of the message. Preferably, this acknowledgement is a short message of which the useful part comprises between 8 and 32 bits, preferably, the useful part comprises 16 bits. Preferably, the connected object transmits its acknowledgement immediately after reception of the message.

Preferably, when the connected object 110 does not have a message to send, it listens continuously to the beacon channel or channels to verify that a gateway 120 does not have a message to deliver to it or even, to select the gateway exhibiting the best RSSI. Alternatively, when the connected object does not have any message to send, it can be placed on standby and reactivated periodically to verify that a gateway does not have any message to deliver to it. Preferably, it is reactivated after a predefined number of periods T. Alternatively, a connected object receives messages only after having transmitted messages. Preferably, it receives this message after a predefined number of periods T, for example, after 2 periods.

Figure 4:
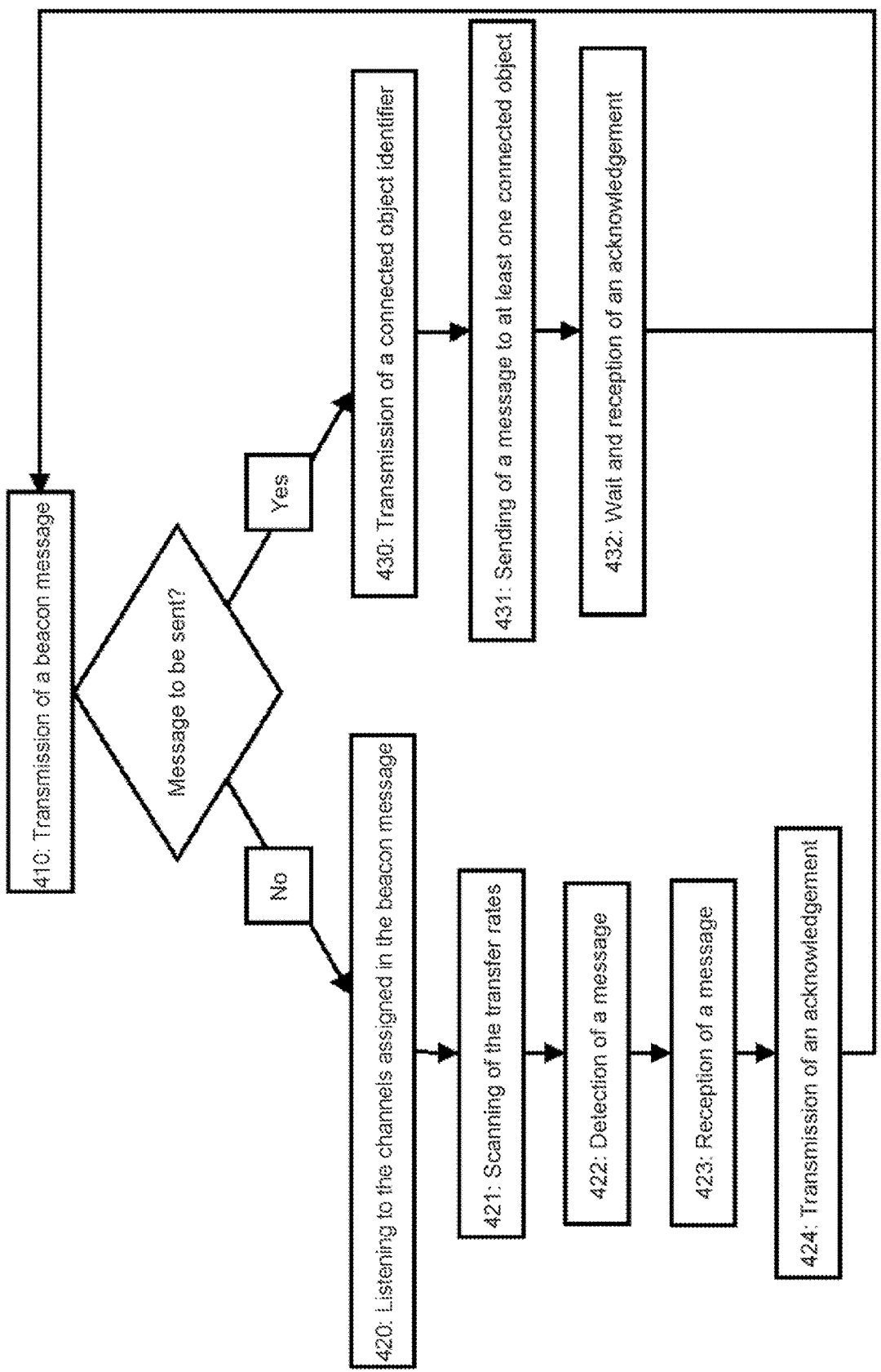
FIG. 4 shows a diagram of the communication method between a gateway and at least one connected object according to the invention.

FIG. 4 shows a diagram of the communication method between a gateway 120 and at least one connected object 110 according to the invention. The first step consists in the transmission of a beacon message 410 by a gateway in its transmission time window in the period T. Next, either the gateway can receive one or more messages, or it has a message to be delivered to one or more connected objects.

In the first case, the gateway 120 listens to the channel or channels that it has indicated in its beacon message 420. Next, the gateway possibly detects a message 422 then receives it 423. Preferably, the gateway 120 simultaneously or sequentially scans different transfer rates to detect a message 421. These transfer rates depend on the SF of the message. The message sent by the connected object 110 can comprise a preamble and the gateway detects at least a part of a preamble.

When the message received has been transmitted with a high transfer rate (in other words a low SF), the transmission time is less than a half-period T (transfer time<½ T) it is then possible to receive a second message during the same period T. For that, the gateway 120 searches for a second preamble from the time t=½ T. If it detects one, it receives the second message.

Preferably, the gateway transmits an acknowledgement of the radiofrequency (RF) transmission 424. For example, this acknowledgement is sent directly after the reception of a message. It can also be sent over the same channel and, preferably, with a transfer rate equal to or less than that of the message transmitted.

In the second case, the gateway 120 has a message to be delivered to one or more connected objects 110. In this case, the gateway transmits a message 431 to one or more connected objects identified in the beacon message over the channel indicated in the same beacon message. Alternatively, the gateway sends a message to a connected object or to a group of connected objects only when they themselves have sent a message a predefined number of periods T (for example two periods) before. Preferably, the beacon message comprises the identifier 430 of the connected object or of the group of connected objects. Preferably, the gateway is set to listen directly after having transmitted its message and waits to receive one or more acknowledgements of the radiofrequency (RF) transmission 432. Preferably, this acknowledgement is received over the same channel and, preferably, with a transfer rate equal to or less than that of the message transmitted.

Figure 5:
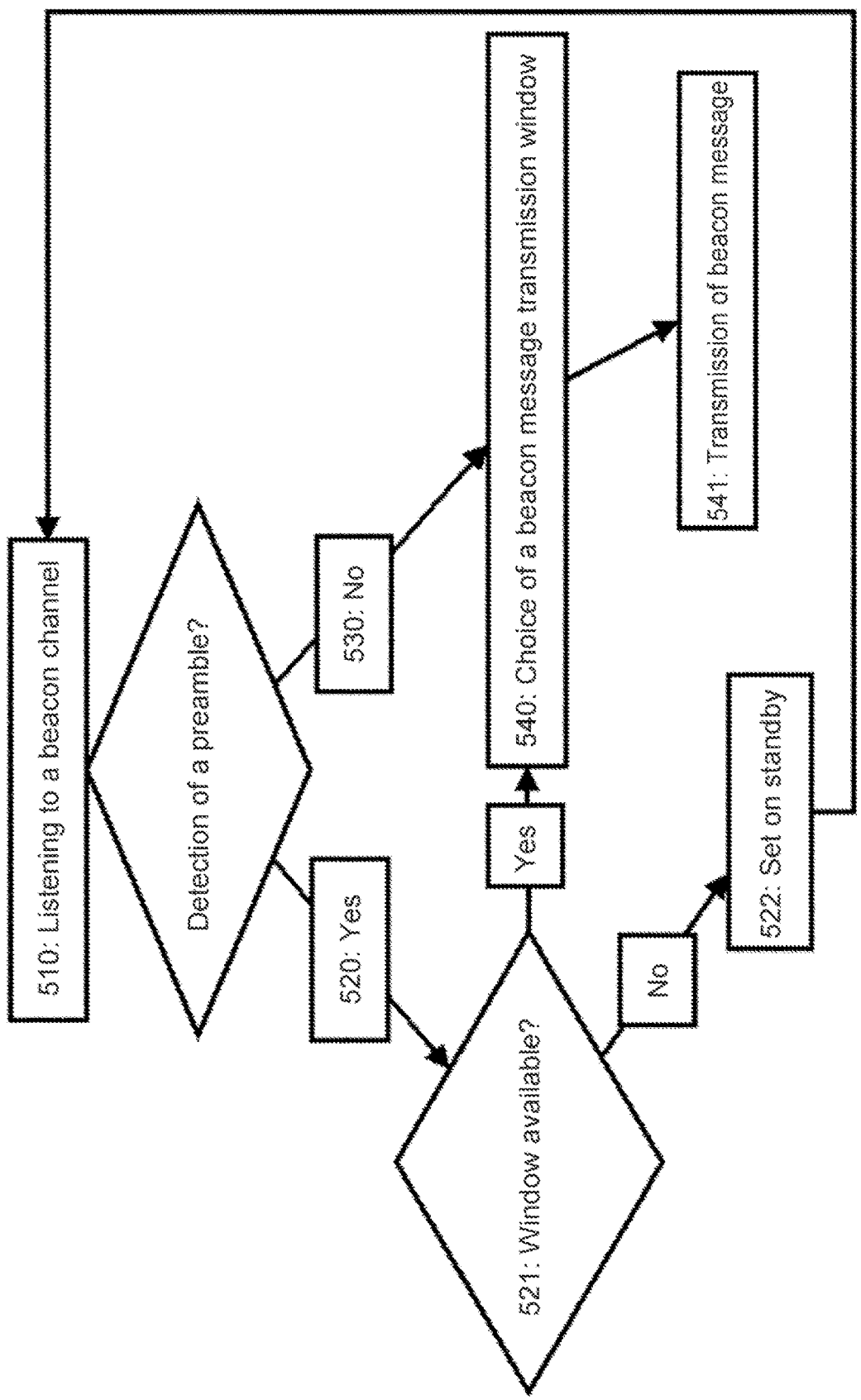
FIG. 5 shows a diagram of the communication method between several gateways according to the invention.

FIG. 5 shows a diagram of the communication method between several gateways 120 according to the invention. When a gateway connects to the network 100, a time window has to be assigned to it. For that, the gateway listens to the beacon channel or channels during least one period T 510. Preferably the gateway listens to the beacon channel or channels a sufficient number of periods T to be able to listen to all the beacon channels for at least one period. Once the beacon channel or channels have been listened to, either the gateway has detected and received at least a part of at least one preamble of a beacon message 520 from another gateway already connected to the network, or the gateway has detected no preamble 530.

In the case where the gateway 120 has detected and received at least a part of at least one preamble of a beacon message 520 from another gateway already connected to the network 100, the gateway verifies that there is at least one time window available 521. If at least one time window is available, the gateway is assigned this window 540. Next, the gateway transmits its beacon message in its window 541. If no time window is available, the gateway is placed on standby 522. Preferably, the gateway placed on standby searches once again for a free time window after a predefined number of periods T. Preferably, the gateway searches once again for a free time window after at least one period T.

In the case where the gateway 120 has not detected any preamble 530, it is assigned a time window 540. Next, the gateway transmits its beacon message in its window 541.

Preferably, a gateway 120 connecting to the network 100 for the first time identifies itself to the central server 130 and, preferably, sends it information on the surrounding gateways that it has detected.

Preferably, a new connected object 110 connecting to the network 100 for the first time identifies itself to the central server 130 via a gateway 120 for example by sending it its identifier. Preferably, the connected object receives a short identifier of the central server via a gateway to identify itself in its subsequent communications and, in particular, for the exchange of acknowledgements.

Alternatively, the central server 130 can schedule the order of the time windows. It can assign the time windows to the gateways 120.

When the network 100 comprises a maximum number of gateways 120 to optimize the use of the time and a new gateway is introduced, it does not find any free time window. The central server 130 can designate this gateway as companion gateway. In this case, the new gateway does not transmit beacon messages but is set as an additional receiver of another gateway which transmits a beacon message. The central server commands this transmitting gateway to provide companion channel information in its beacon message for a connected object 110 to be able to transmit a message to the companion gateway. This makes it possible, in the best of cases, to double the reception capacity of the network.

Preferably, a connected object 110 transmitting a message will choose pseudo-randomly between the companion channel and the normal channel for its communication, the information on these channels being transmitted in the beacon message.

Figure 6:
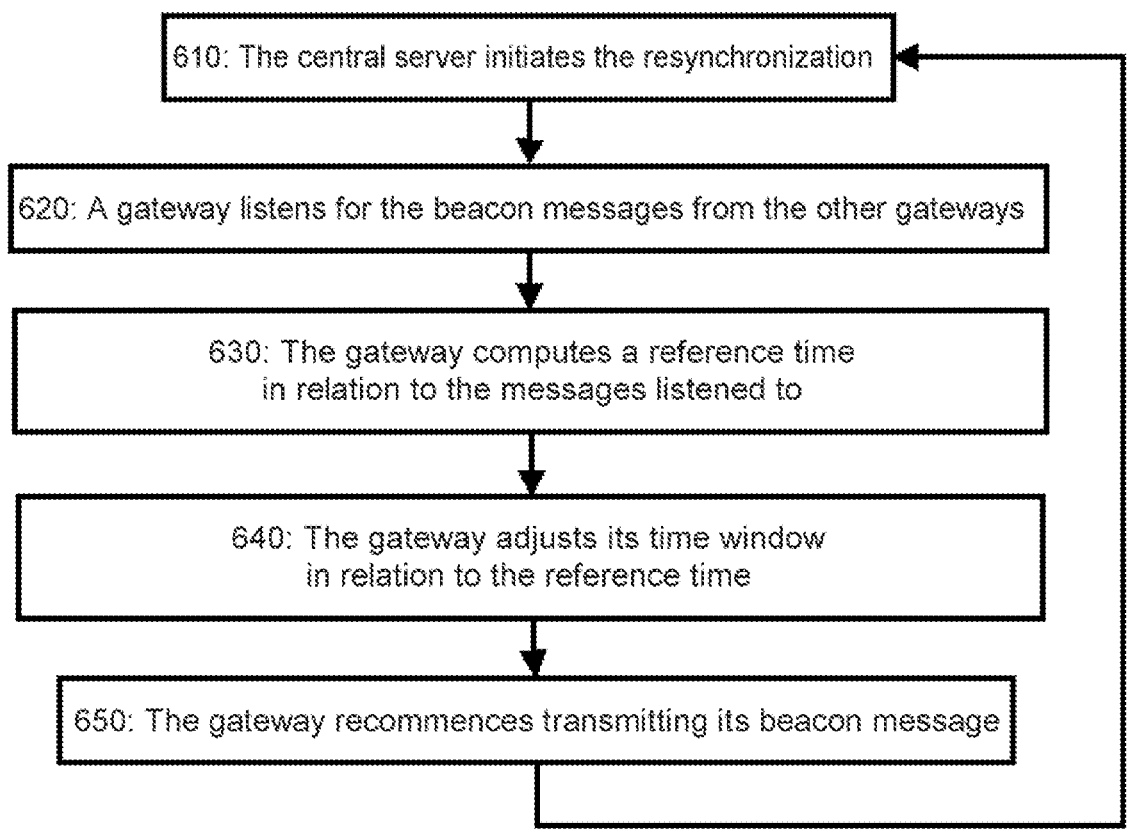
FIG. 6 shows a diagram of the synchronization method between several gateways according to the invention.

FIG. 6 shows a diagram of the synchronization method between several gateways 120 according to the invention. Preferably, the central server 130 monitors and controls the synchronization 610 between the gateways after a predefined number of periods T. Preferably, this number of periods is at least 10 periods.

A gateway 120 which wants to be synchronized begins by listening for at least a part of the beacon message from the other gateways 620. During the resynchronization, a gateway does not therefore transmit its beacon message for at least one period T and preferably not more than four periods T. Next, from the times at which the gateway has heard the (parts of) beacon messages from the other gateways, it computes a reference time 630. From this reference time, the gateway adjusts its time window 640 to transmit its beacon message at the right moment. Finally, the gateway recommences transmitting its beacon message 650 in its time window. For example, if an accuracy of the order of 5 ppm for the internal clock of a gateway is considered, the deviation will be of the order of 0.6 ms for a cycle of 128 s. Given other uncertainties, it is possible to take a safety factor of 3, that is to say that the deviation will be approximately 2 ms over a cycle of 128 s, which constitutes an acceptable deviation. For a gateway to transmit its beacon message in its time window, it is necessary for all of the gateways to be resynchronized at least once per cycle of 128 s (Tsync), preferably twice. If a set of ten gateways is considered, that means that each gateway is synchronized in relation to the others every 12 beacon message transmission periods T (in other words, one time in 12, the gateway does not transmit its beacon message), which gives: $12*T \approx 6.5$ s and $10*12*T \approx 64$ s $\approx \frac{1}{2}$ Tsync.

Figure 7:
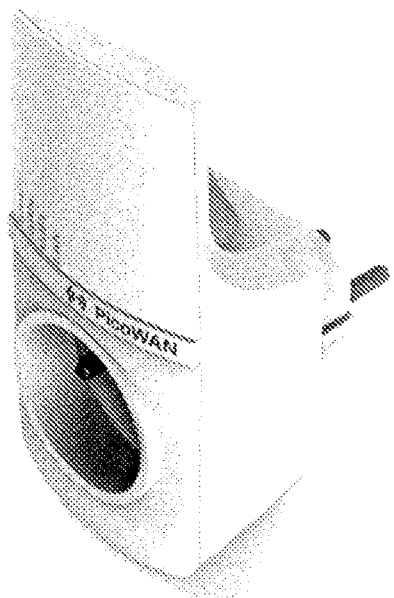
FIG. 7 shows a device implementing the methods according to the invention relative to the gateways.

FIG. 7 shows a device implementing the methods relating to the gateways as described above. The device comprises a radiofrequency (RF) modulator-demodulator (modem). Preferably, this device comprises an Ethernet plug and/or a Wi-Fi connection. The device can be powered, for example, via a current outlet or via an Ethernet cable. Preferably, the device uses an SX127x chip and, even more preferably, the SX1276 chip as described in the patent application US2014219329. Preferably, this device operates in the 868 MHz ISM frequency band. Preferably, the device has a maximum size less than 30 cm.

The devices implementing the methods relating to the connected objects comprise a radiofrequency (RF) modulator-demodulator (modem). Preferably, the device comprises a specific power supply such as a cell or a battery. Preferably, the device uses an SX127x chip and, even more preferably, the SX1276 chip as described in the patent application US 2014/219329. Preferably, this device operates in the 868 MHz ISM frequency band. Preferably, the device is compatible with the LoRaWAN™ MAC. Preferably, the device is also compatible with the Sigfox™ MAC.

The prior art described in the patent application US 2014/0111313 describes a network comprising gateways and connected objects in which the gateways transmit a periodic signal comprising: a beacon message, timeslots for the exchange of data with a connected object, a join request slot and a join acknowledgement.

Such a network does not make it possible to connect a large number of connected objects to a gateway, does not optimally use the communication time, does not exploit the possibility of using several data exchange channels and requires the connected objects to be registered with a gateway. These problems ae linked to the structure of the periodic signal which, for each gateway, allocates uplink and downlink communication windows to each connected object linked to said gateway, whether or not this connected object has a message to be transmitted. To guarantee a reasonable periodic signal period (of the order of a few tens of seconds), the number of communication windows must be limited and, consequently, the number of connected objects is also limited. The network does not provide a communication protocol allowing a large number of connected objects to transmit messages to a gateway. The method according to the invention resolves this problem by virtue of the transmission by the gateway of a one-way beacon message in a beacon channel reserved for this purpose. This beacon signal makes it possible to organize the communications in time and in frequency. Although the use of a reserved beacon channel is known in telecommunications, it is not obvious to develop a beacon message whose structure (preamble, indication of an exchange channel, availability of the gateway) as described in the present application makes it possible to optimally organize the exchanges of data in a frequency band like the 868 MHz ISM band. This organization allows a connected object to send a message over a channel specified in the beacon message only when it needs to. This connected object therefore does not use a time window constantly and connects to a gateway only when necessary. It is therefore potentially possible to connect an infinite number of connected objects to a gateway.

The method according to the invention also resolves the ancillary problems such as the best organization of the time and the use of the communication frequencies. It also allows the connected objects to not have to remain synchronized to avoid transmitting or receiving data outside of their time slot and does so by allowing the objects to be based only on the transmission of the beacon signal. The addition of a gateway is also facilitated by the use of a beacon channel. In effect, a new gateway can, by listening to the beacon channel, detect other gateways and be incorporated in the transmission period, thus reinforcing the capacities of the network. The beacon channel finally allows the gateways to be synchronized in relation to one another.

One of the aims of the invention was to resolve the problems of saturation of the networks and to optimize the use of the time. This aim was achieved by recourse to the use of beacon messages transmitted over a beacon channel and transmitted periodically by gateways. These beacon messages make it possible to organize the time by notifying the connected objects of the availability of a gateway to transmit or receive messages. These messages also allow the connected objects to select a gateway with which they will have a good communication. The communication procedure is also simple because the connected objects can send a message at any moment from the instant when they receive a beacon message. Finally, the gateways are organized without outside intervention and the addition of a gateway makes it possible (without outside intervention) to increase the capacities of the network and avoid the saturation thereof.

The present invention has been described in relation to specific embodiments, which have a purely illustrative value and should not be considered limiting. Generally, the present invention is not limited to the examples illustrated and/or described above. In particular, the invention relates also to the combinations of the technical features of the embodiments described above. The use of the verbs "comprise", "include", "compose", or any other variant, as well as their conjugations, cannot in any way exclude the presence of elements other than those mentioned. The use of the indefinite article "a", "an", or of the definite article "the" to introduce an element, does not exclude the presence of a plurality of these elements. The reference numbers in the claims are not limited in their scope.

To sum up, the invention can also be described as follows. Communication methods in a wireless communication network 100 comprising a plurality of connected objects 110, a gateway 120 and a central server 130. These elements communicating with one another by messages sent and received over frequency channels. A channel being reserved for the periodic transmission of beacon messages by the gateways, which makes it possible to organize and optimize the usage and communication time of the network 100.

The invention claimed is:

1. A communication method in a wireless communication network using a plurality of channels each having a central frequency and a bandwidth, said network comprising a plurality of connected objects and a plurality of gateways, said connected objects and said gateways being able to transmit and receive messages in each of the channels, at least one of these channels, called a beacon channel, being a one-way communication channel reserved for the periodic or quasi-periodic transmission of beacon messages by the gateways, a period of transmission of beacon messages being a period T, said beacon messages being transmitted in time windows specific to each gateway, within said period T, said beacon messages comprising:
   a preamble;
   either an indication that the gateway wants to deliver a message or that it is able to receive at least one message; and
   an indication of at least one channel among said plurality of channels for exchanging at least one message, said channel being different from said beacon channel;
   the method by which,
   A) a connected object transfers a message to a gateway by executing the following steps:
   1) listening to the beacon channel or channels to detect at least a part of at least one beacon message;
   2) selection of a gateway transmitting a beacon message perceptible by the connected object;
   3) reception of the beacon message transmitted by the selected gateway and verification, by the connected object, that this gateway is able to receive a message;
   4) transmission of a message by the connected object to the selected gateway over at least one channel indicated in the beacon message;
   and/or
   B) a connected object receives a message from a gateway by executing the following steps:
   1) listening to the beacon channel or channels to receive at least one beacon message;
   2) verification by the connected object that the gateway wants to deliver a message to said connected object;
   3) reception of a message by the connected object over at least one channel indicated in the beacon message.

2. The method as claimed in claim 1, wherein the step A)1 consists in listening to the beacon channel or channels to detect at least a part of at least one preamble of a beacon message, said part of preamble making it possible to determine an RSSI of the signal transporting the beacon message and in which the gateway selected in the step A)2 is chosen as a function of the RSSI.

3. The method as claimed in claim 1, wherein the beacon message further comprises at least one identifier of at least one connected object and in which the step B)2 of consists in the verification by the connected object that the at least one identifier contained in the beacon message is its own.

4. The method as claimed in claim 1, wherein step A) comprises the additional step: choice of the transfer rate as a function of the RSSI for this rate to be higher when the RSSI is high and lower when the RSSI is lower, this step being performed between the steps A)3 and A)4.

5. The method as claimed in claim 4, wherein the connected object waits for a period of time which is a function of the chosen transfer rate before performing the step A)4.

6. The method as claimed in claim 1, wherein the steps A) and/or B) respectively comprise the steps of reception and of transmission of an acknowledgement over the same channel as that used either for the transmission or for the reception, this step being executed after the transmission or the reception of a message.

7. The method as claimed in claim 6, wherein the acknowledgement is an acknowledgement of the radiofrequency transmission and is sent directly after the reception of a message.

8. The method as claimed in claim 4, wherein the acknowledgement is transmitted or received with a transfer rate equal to or less than that of the message received or transmitted.

9. The method as claimed in claim 1, wherein the gateway chosen in the step A)2 is a gateway having the highest RSSI.

10. The method as claimed in claim 1, wherein the gateway chosen in the step A)2 is a gateway having a high quality of service (QoS).

11. The method as claimed in claim 1, wherein the network further comprises a central server, said central server being able to assign a gateway to a connected object.

12. A device comprising a radiofrequency modem, characterized in that it implements a procedure as claimed in claim 1.

13. A communication method in a wireless communication network using a plurality of channels each having a central frequency and a bandwidth, said network comprising a plurality of connected objects and a plurality of gateways, said connected objects and the at least one gateway being able to transmit and receive messages in each of the channels, at least one of these channels, called a beacon channel, being a one-way communication channel reserved for the periodic or quasi-periodic transmission of beacon messages by the gateways, a period of transmission of beacon messages being a period T, said beacon messages being transmitted in time windows specific to each gateway, within said period T, and comprising:
   a preamble;
   either an indication that the gateway wants to deliver a message or that it is able to receive at least one message; and
   an indication of at least one channel for exchanging at least one message;
   the method by which,
   A) a gateway transmits, in its time window, a signal transporting a beacon message;
   B) a gateway receives at least one message from a connected object:
   1) the gateway listens to the channel or channels assigned in the beacon message to detect a message:
   2) the gateway receives the message or messages;
   and/or C) a gateway sends at least one message to at least one connected object over the at least one channel indicated in the beacon message.

14. The method as claimed in claim 13, wherein the beacon message further comprises at least one identifier of at least one connected object and in which the at least one connected object to which a message is sent in the step C) is identified by at least one identifier.

15. The method as claimed in claim 13, wherein the step B)1 consists of: the gateway scans different transfer rates simultaneously or sequentially and listens on the channel or channels assigned in the beacon message to detect a message.

16. The method as claimed in claim 15, wherein the message sent by the connected object comprises a preamble and wherein step B)1 consists of: the gateway scans different transfer rates and listens on the channel or channels assigned in the beacon message to detect at least a part of a preamble.

17. The method as claimed in claim 13, wherein the steps B) and/or C) respectively comprise the steps of transmission and of reception of an acknowledgement over the same channel as that used either for the reception or for the transmission, this step being executed after the reception or the transmission of a message.

18. The method as claimed in claim 16, wherein the acknowledgement is an acknowledgement of the RF transmission and is sent directly after the reception of a message.

19. The method as claimed in claim 15, wherein the acknowledgement is transmitted or received with a transfer rate equal to or lower than that of the message received or transmitted.

20. A device comprising a radiofrequency modem, characterized in that it implements a procedure as claimed in claim 13.

21. A communication method in a wireless communication network using a plurality of channels each having a central frequency and a bandwidth, said network comprising a plurality of connected objects and a plurality of gateways, said connected objects and said gateways being able to transmit and receive messages in each of the channels, at least one of these channels, called a beacon channel, being a one-way communication channel reserved for the periodic or quasi-periodic transmission of beacon messages by the gateways, said beacon messages being transmitted in time windows specific to each gateway, said beacon messages comprising:
   a preamble;
   either an indication that the gateway wants to deliver a message or that it is able to receive at least one message; and
   an indication of at least one channel among said plurality of channels for exchanging at least one message, said channel being different from said beacon channel;
   the method by which,
   A) a connected object transfers a message to a gateway by executing the following steps:
   1) listening to the beacon channel or channels to detect at least a part of at least one beacon message;
   2) selection of a gateway transmitting a beacon message perceptible by the connected object;
   3) reception of the beacon message transmitted by the selected gateway and verification, by the connected object, that this gateway is able to receive a message;
   4) transmission of a message by the connected object to the selected gateway over at least one channel indicated in the beacon message;
   and/or
   B) a connected object receives a message from a gateway by executing the following steps:
   1) listening to the beacon channel or channels to receive at least one beacon message;
   2) verification by the connected object that the gateway wants to deliver a message to said connected object
   3) reception of a message by the connected object over at least one channel indicated in the beacon message;
   wherein a time window is associated with a gateway by executing the steps of:
   a) listening, by the gateway to the beacon channel or channels during at least one entire period of transmission of beacon messages;
   b) either, the gateway detects at least a part of a preamble and at least one time window is available, then the gateway chooses one of these windows and the gateway transmits its beacon message;
   c) or, the gateway detects at least a part of a preamble and no time window is available, then the gateway is set to standby;
   d) or the gateway detects no preamble, then it chooses a time window and it transmits its beacon message.

22. The method as claimed in claim 21, wherein a gateway which was set on standby in the step c) reactivated after at least one period of transmission of beacon messages and recommences the steps a), b) and/or d).

23. The method as claimed in claim 21, wherein the network further comprises a central server, said server determining the order of the time windows of each of the gateways.

24. The method as claimed in claim 21, wherein the network further comprises a central server, said server assigning the time windows to the gateways.

25. The method as claimed in claim 21, wherein the network further comprises a central server, said server assigning a companion channel to a gateway, this companion channel allowing only the gateway to receive messages in a time window used by another gateway.

26. The method as claimed in claim 21, wherein a gateway is resynchronized by performing the following steps:
   listening for at least a part of the beacon messages from the other gateways for at least one entire period of transmission of beacon messages;
   the gateway computes a reference time as a function of the beacon message or messages received;
   the gateway adjusts its time window.

27. The method as claimed in claim 21, wherein the network further comprises a central server, said server controlling and initiating the synchronization of each gateway after a predefined number of periods of transmission of beacon messages.

* * * * *